Aug. 19, 1958 P. VAN HORNE SERRELL 2,848,163
RECORD MEMBER FOR COMPUTING SYSTEM
Filed Sept. 20, 1954
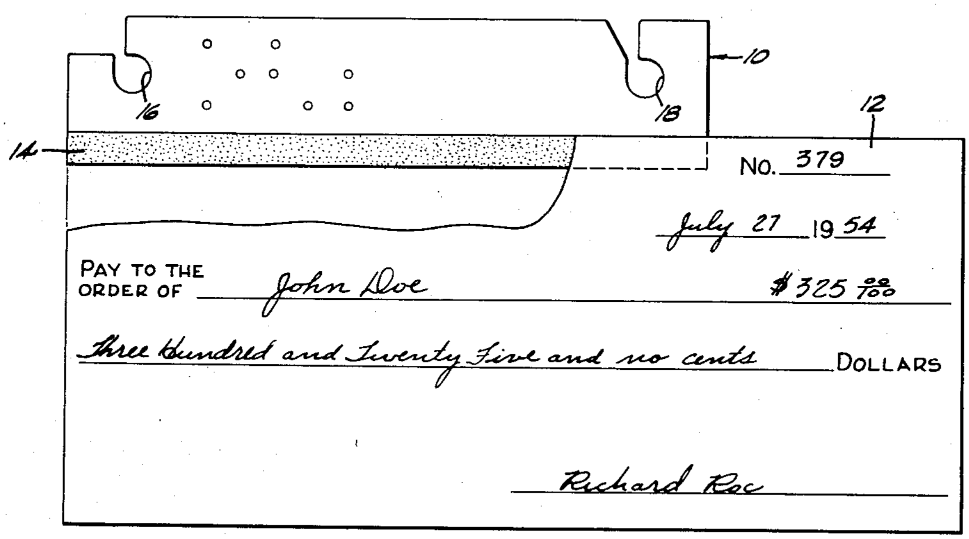
FIG. 1.
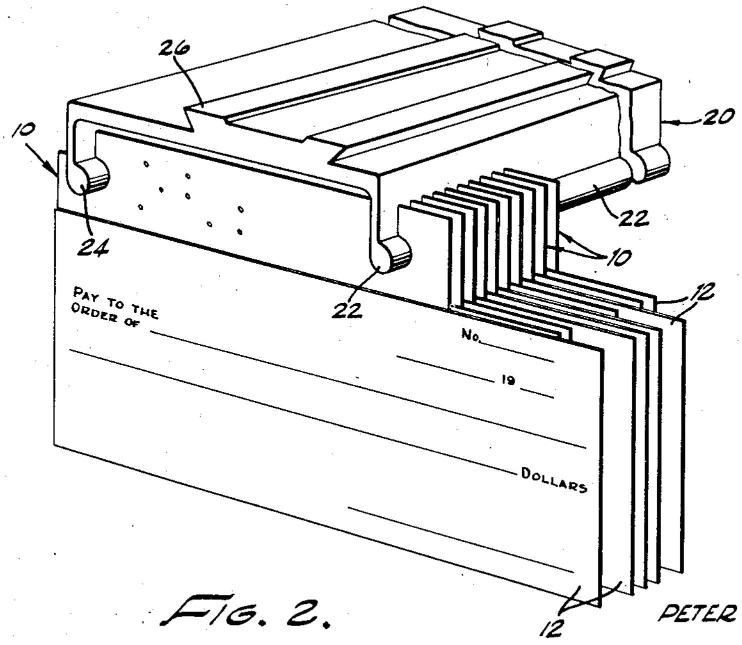
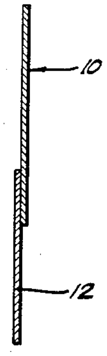
FIG. 3.
FIG. 2.
PETER VAN HORNE SERRELL
INVENTOR.
BY Lyon & Lyon
ATTORNEYS 2,848,163

RECORD MEMBER FOR COMPUTING SYSTEM

Peter Van Horne Serrell, Pasadena, Calif., assignor to International Telemeter Corporation, Los Angeles, Calif., a corporation of Delaware Application September 20, 1954, Serial No. 456,960

5 Claims. (Cl. 235—61.12)

The present invention relates to a system enabling machine handling of documents or papers and the like and, more specifically, to an improvement in a system wherein a check, charge slip, or other document, has attached thereto an auxiliary paper containing information in what may be termed "machine language" which duplicates some of the information on the document in what may be termed "human language."

In an application for a Computing System, filed November 19, 1952, Serial Number 321,452, to George W. Brown and Louis N. Ridenour, who are assignees of the present assignee, there is described a system wherein an element or tab having information thereon in "machine language" which duplicates some of the information in "human language" appearing on a document to which the tab is affixed enables handling automatically of the document as well as rapid machine utilization of the information contained therein by means of reading the information in machine language on the tab. The term "human language" has been defined as readable typewritten or handwritten matter on a business form such as a check, invoice, order, and the like, while the term "machine language" refers to either perforations or other indicia in, for example, the binary code which represents the aforementioned human language. The term "handling" is taken to mean sorting, collating, filling, etc.

The invention described in the previously mentioned application consists of such a tab carried by the check or other document enabling the machine handling thereof. As was pointed out, these documents are usually of the type that are subject to much handling before being returned for processing and are usually folded or wrinkled and do not lend themselves to utilization for automatic processing. This is aside from the redundant handling of a document which occurs in the usual course of business, as illustrated by the present check processing practice. The affixation of the tab or element with machine language which substantially duplicates or includes the language on the document enables machine handling and eliminates redundant handling by people of the attached document.

In the handling of large numbers of documents whether or not tabs are affixed thereto, it becomes rather cumbersome to tie up or package in some manual fashion a large number of these documents so that they do not lose either the sequence in which they are stacked or the separate identity of a package. Further, for the purpose of automatically handling these documents, it was found that the condition of large numbers of the documents do not permit actual sorting, collating, or other handling by the document itself.

A feature of this invention is the provision of an improved tab which enables handling of the attached document by handling the tab.

Another feature of this invention is the provision of an improved tab having perforations to enable its stacking and storage.

Still another feature of this invention is the provision of an improved tab for affixation to an information-bearing document having "handling" perforations which enable the insertion or removal of a tab from a storage cartridge without tearing or catching or danger of falling of the cartridge.

These and other features of the invention are provided in an improved tab which has adhesive applied to one edge for attachment to a document, a rectangular piece cut out of one of the corners opposite the adhesive-bearing edge with a circular aperture having substantially 30° of its periphery opened to the cutout rectangular portion and a second perforation near the other corner having a substantially 30° portion of its periphery extending out to the edge whereby the tab is enabled to be inserted onto one end of the rails of a cartridge. The tab carrying therewith the attached document is suspended from the rails and thus can be readily transported without damage, loss, or other inadvertence. If removal from the cartridge is desired, unloading in order is readily done from one end. Removal of a single document may be obtained by a gentle sidewise tug.

The novel features that are considered characteristic of this invention are set forth with particularity in the appended claims. The invention itself, both as to its organization and method of operation, as well as additional objects and advantages thereof, will best be understood from the following description when read in connection with the accompanying drawings, in which:

Figure 1 is a drawing of an embodiment of the invention with a check attached thereto by way of illustration;

Figure 2 illustrates how the improved tab may be loaded on a cartridge for storage and maintaining the order of stacking; and Figure 3 is a section through Figure 1.

As has been described in the application by George W. Brown and Louis N. Ridenour for a Computing System, Serial Number 321,452, the employment of the tab with a document such as a check, for example, enables the elimination of much redundant activity in the processing of such checks besides expediting any accompanying accounting work which may be required. The tab bears data in machine language which is derived from the information in human language on the accompanying document. This data may be punched or magnetically applied, or applied using ink marks.

An application for a Tab-Affixing Device, Serial No. 457,248, filed September 20, 1954, now Patent No. 2,808,871, by George James Brown and assigned to assignee describes how a tab is affixed to a document. In apparatus for a Sorting and Stacking Apparatus by George James Brown and George W. Brown, Serial No. 457,171, filed September 20, 1954, and assigned to a common assignee, there is described apparatus whereby information on a tab may be utilized for automatically sorting and stacking in accordance with the sort on a cartridge.

The improved tab 10 is shown in Figure 1 with a check 12 attached thereto. The tab consists of material which may have any desired thickness but preferably one on the order of substantially twice the thickness of the document to which it is to be affixed. One edge of the tab 14 may have mucilage or adhesive material of any desired type for attachment thereof to the information-bearing document 12. There are two apertures in the tab 16, 18 which are respectively positioned near the two corners opposite the adhesive-bearing edge. It will be noted that a rectangular section of one corner of the tab is omitted and this is obtained by making the width and the length of the tab sides extending to that corner shorter than the width and length of the opposite sides. The human language on the check is substantially duplicated in machine language on the tab in the form of coded perforations which are placed in the space between the two apertures.

At the corner of the omitted rectangular section there is provided a circular aperture 16 with substantially about 30° of its periphery opening outward to the omitted rectangular section. A substantially similar aperture 18 is near the corner of the other tab and it, too, has substantially 30° of its periphery opening outward in a 30° angle to the edge opposite the adhesive-bearing edge. The reason for the selection of the apertures and angular openings is as a result of determining which apertures and openings would enable a tab to be held by a cartridge such as is shown in Figure 2 without being removable at the slightest touch and yet permitting removal without tearing the peripheries of the apertures. It should be noted that the openings to the edge are from one side of the circular apertures. This was done to permit sufficient tab material to bear the weight of the tab and the document to which it is attached when the tab is supported from the apertures in the manner shown in Figure 2. Further, this prevents tabs from falling off the rails due to downward pulls. With the apertures placed in the manner shown, removal of a single tab can only be done by a pull to the right and downwards. Apertures in adjacent tabs to not hook onto one another either while being transported or while being removed in view of the manner of opening the apertures to the edges of the tabs.

In Figure 2 is shown the cartridge 20 upon which these tabs carrying documents are loaded. The cartridge shown in fragmentary view consists of two rails 22, 24 having dimensions to enable the insertion thereof into the tab apertures. An application has been filed for the Cartridge, Serial Number 457,238, filed September 20, 1954, now abandoned, by this inventor and assigned to a common assignee. Either manually or by means of other co-operating apparatus the tabs with the attached documents are readily transferred to or unloaded from a cartridge at one end. This facilitates the transportation, storage, and any other required handling of a large number of these without the necessity for wrapping, tying, or other packaging methods which are time consuming and most often, in unwrapping, result in disorder. The fresh tab surface enables any automatic handling requiring a smooth surface without regard to the condition of the accompanying document. The cartridge has a keyway 26 on top which enables its insertion into any other cooperating or protective apparatus.

Accordingly, there has been shown and described hereinabove a novel and improved tab element for attachment to an information-bearing document, said tab bearing duplication of some of the information on the document and having apertures to enable the facilitation of the handling and storage of the documents attached thereto.

What is claimed is:

1. A tab for affixation to an information bearing document comprising a substantially rectangular sheet having means for attachment to said document along one edge, a portion of one corner opposite said one edge being omitted, a first circular aperture in said tab positioned near and opening out to said omitted corner through one side of a less than ninety-degree sector of said periphery, a second circular aperture in said tab positioned near the other corner opposite said one edge and opening from one side thereof out to the edge opposite said one edge, and an area for bearing information in between.

2. A tab as recited in claim 1 wherein said angle of opening outward of said first and second aperture is approximately thirty degrees.

3. A tab for affixation to an information bearing document comprising a substantially rectangular sheet having adhesive material along one edge, having walls defining a substantially rectangular cutout portion at one of the corners opposite said one edge, a circular aperture in the body of said tab positioned to open out at one side to said rectangular cutout through a substantially 30° portion of the periphery of said circular aperture, a second circular aperture in the body of said tab near its other corner opposite said one edge, walls defining a 30-degree opening between one side of said second circular aperture and said opposite edge, and an information-bearing area between said first and second apertures.

4. In a system of the character described, a completed check having information thereon in human language, a tab having some of said human language thereon as machine language, means affixing said tab at one edge to an edge of said check, a pair of circular perforations near the other edge of said tab each opening out to said other edge through a less than ninety-degree sector of said periphery to enable stacking and carrying of said check by said tab.

5. In a system of the character described a completed check having information written thereon in human language, a tab having some of said human language thereon as machine language, means affixing said tab at one edge to an edge of said check, one side of said tab being less wide than the other side, the side opposite said one edge being shorter than said one edge to form a rectangular cutout at one corner, a circular aperture in the body of said tab positioned to open out to said rectangular cutout portion at one side through a substantially 30-degree portion of the periphery of said circular aperture, a second circular aperture in the body of said tab near its other corner opposite said one edge, and walls defining a 30-degree opening between one side of said second circular aperture and said opposite edge, said machine language on said tab being between said first and second apertures.

References Cited in the file of this patent

UNITED STATES PATENTS

| | | |
|---|---|---|
| 622,940 | Brydges | Apr. 11, 1899 |
| 2,459,263 | Callanan | Jan. 18, 1949 |